(12) United States Patent
Van Leuven et al.

(10) Patent No.: US 10,602,163 B2
(45) Date of Patent: Mar. 24, 2020

(54) ENCODER PRE-ANALYSER

(71) Applicant: Magic Pony Technology Limited, London (GB)

(72) Inventors: Sebastiaan Van Leuven, London (GB); Zehan Wang, London (GB); Robert David Bishop, London (GB)

(73) Assignee: Magic Pony Technology Limited, London (GB)

( * ) Notice: Subject to any disclaimer, the term of this patent is extended or adjusted under 35 U.S.C. 154(b) by 0 days.

(21) Appl. No.: 15/856,906

(22) Filed: Dec. 28, 2017

(65) Prior Publication Data

US 2018/0124415 A1    May 3, 2018

Related U.S. Application Data

(63) Continuation of application No. PCT/GB2017/051253, filed on May 5, 2017.

(30) Foreign Application Priority Data

May 6, 2016  (GB) .................................. 1607994.9

(51) Int. Cl.
  *H04N 19/30*  (2014.01)
  *H04N 19/174*  (2014.01)
  (Continued)

(52) U.S. Cl.
  CPC .......... *H04N 19/30* (2014.11); *H04N 19/103* (2014.11); *H04N 19/119* (2014.11);
  (Continued)

(58) Field of Classification Search
  CPC .... H04N 19/30; H04N 19/103; H04N 19/119; H04N 19/124; H04N 19/139;
  (Continued)

(56) References Cited

U.S. PATENT DOCUMENTS 5,134,396 A   7/1992  Sirat et al.
5,638,125 A   6/1997  Ahn et al.
(Continued)

FOREIGN PATENT DOCUMENTS

CN    101621683 A    1/2010
CN    102148996 A    8/2011
(Continued)

OTHER PUBLICATIONS

Search Report for Application No. GB1607994.9, dated Nov. 3, 2016, 6 pages.
(Continued)

*Primary Examiner* — Maria E Vazquez Colon
(74) *Attorney, Agent, or Firm* — Brake Hughes Bellermann LLP (57) ABSTRACT

The present disclosure relates to analysing input data, prior to encoding, using one or more hierarchical algorithms. According to a first aspect, there is provided a method for producing output data using one or more input data and one or more hierarchical algorithms, comprising the steps of applying the hierarchical algorithm to the one or more input data; and producing output data to be used by an encoder; wherein one of the one or more input data is uncompressed; and wherein the output data is used to modify a decision making process associated with the encoder.

17 Claims, 5 Drawing Sheets

(51) Int. Cl.

| | |
|---|---|
| *H04N 19/196* | (2014.01) |
| *H04N 19/149* | (2014.01) |
| *H04N 19/103* | (2014.01) |
| *H04N 19/176* | (2014.01) |
| *H04N 19/119* | (2014.01) |
| *H04N 19/124* | (2014.01) |
| *H04N 19/139* | (2014.01) |
| *H04N 19/159* | (2014.01) |
| *H04N 19/169* | (2014.01) |
| *G06N 5/04* | (2006.01) |

(52) U.S. Cl.
CPC ......... *H04N 19/124* (2014.11); *H04N 19/139* (2014.11); *H04N 19/149* (2014.11); *H04N 19/159* (2014.11); *H04N 19/174* (2014.11); *H04N 19/176* (2014.11); *H04N 19/1883* (2014.11); *H04N 19/196* (2014.11); *G06N 5/04* (2013.01)

(58) Field of Classification Search
CPC .. H04N 19/149; H04N 19/159; H04N 19/174; H04N 19/176; H04N 19/1883; H04N 19/196; G06N 5/04
See application file for complete search history.

(56) References Cited

U.S. PATENT DOCUMENTS

| | | | |
|---|---|---|---|
| 5,831,678 A * | 11/1998 | Proctor | G06T 9/008 375/240.22 |
| 6,075,884 A * | 6/2000 | Lubin | G06K 9/66 375/E7.13 |
| 7,676,441 B2 | 3/2010 | Matsugu et al. | |
| 8,037,010 B2 | 10/2011 | Jaros et al. | |
| 8,311,967 B1 | 11/2012 | Lin et al. | |
| 8,467,599 B2 * | 6/2013 | El Dokor | G06K 9/00221 382/159 |
| 9,906,787 B2 | 2/2018 | Amon et al. | |
| 2003/0071908 A1 | 4/2003 | Sannoh et al. | |
| 2004/0086039 A1 | 5/2004 | Reynolds et al. | |
| 2004/0136567 A1 | 7/2004 | Billinghurst et al. | |
| 2004/0150538 A1 | 8/2004 | Kim et al. | |
| 2004/0218834 A1 | 11/2004 | Bishop et al. | |
| 2005/0063461 A1 * | 3/2005 | Lee | H04N 19/139 375/240.03 |
| 2005/0200757 A1 | 9/2005 | Pica et al. | |
| 2007/0172452 A1 | 7/2007 | Klucher et al. | |
| 2007/0223887 A1 | 9/2007 | Kanamori et al. | |
| 2009/0034622 A1 | 2/2009 | Huchet et al. | |
| 2009/0067491 A1 | 3/2009 | Sun et al. | |
| 2009/0110285 A1 | 4/2009 | Elad et al. | |
| 2009/0232213 A1 | 9/2009 | Jia | |
| 2010/0020874 A1 | 1/2010 | Shin et al. | |
| 2010/0150229 A1 | 6/2010 | Francois et al. | |
| 2010/0183217 A1 | 7/2010 | Seung et al. | |
| 2011/0299770 A1 | 12/2011 | Vaddadi et al. | |
| 2012/0288015 A1 | 11/2012 | Zhang et al. | |
| 2012/0294369 A1 | 11/2012 | Bhagavathy et al. | |
| 2013/0128111 A1 | 5/2013 | Corral-Soto | |
| 2013/0223734 A1 | 8/2013 | Tuzel et al. | |
| 2014/0177706 A1 | 6/2014 | Fernandes et al. | |
| 2014/0204996 A1 | 7/2014 | Spears et al. | |
| 2014/0301661 A1 | 10/2014 | Voronov et al. | |
| 2014/0369401 A1 | 12/2014 | Minoo et al. | |
| 2015/0015569 A1 | 1/2015 | Jung et al. | |
| 2015/0181159 A1 | 6/2015 | Matsuyama | |
| 2016/0078600 A1 | 3/2016 | Perez Pellitero et al. | |
| 2016/0140408 A1 | 5/2016 | Shen et al. | |
| 2018/0139458 A1 | 5/2018 | Wang et al. | |

FOREIGN PATENT DOCUMENTS

| | | | |
|---|---|---|---|
| EP | 0618737 | A2 | 10/1994 |
| EP | 1720358 | A2 | 11/2006 |
| EP | 2557789 | A2 | 2/2013 |
| KR | 20030009575 | A | 2/2003 |
| WO | 9739417 | A2 | 10/1997 |
| WO | 02/005208 | A3 | 1/2002 |
| WO | 2008133951 | A2 | 11/2008 |
| WO | 2013143396 | A1 | 10/2013 |
| WO | 2014052740 | A1 | 4/2014 |
| WO | 2017/191463 | A1 | 11/2017 |

OTHER PUBLICATIONS

International Search Report and Written Opinion for PCT Application No. PCT/GB2017/051253, dated Aug. 2, 2017, 12 pages.
International Preliminary Report on Patentability for International Application PCT/GB2017/051253, dated Nov. 15, 2018, 9 pages.
"CS231n Convolutional Neural Networks for Visual Recognition", retrieved on Feb. 16, 2015, XP055488606, 2 pages.
Wikipedia, "Universal Approximation Theorem", retrieved from http://web.archive.org/web/20100701194338/https://en.wikipedia.org/wiki/Universal_approximation_theorem, Jun. 10, 2010, 2 pages.
Atreya, et al., "Novel Lossy Compression Algorithms With Stacked Autoencoders", retrieved from at http://cs229.stanford.edu/proj2009/AtreyaOshea.pdf, Dec. 11, 2009, 5 pages.
Bevilacqua, et al., "Video Super-Resolution Via Sparse Combinations of Key-Frame Patches in a Compression Context", 30th Picture Coding Symposium (PCS), Dec. 8, 2013, 5 pages.
Bishop, et al., "Super-Resolution Enhancement of Video", International Workshop on Artificial Intelligence and Statistics (AISTATS 2003), No. 9th, Jan. 2003, pp. 1-8.
Cayton, "Algorithms for manifold learning", Jun. 15, 2005, 17 pages.
Cheng, et al., "Fast Video Super-Resolution Using Artificial Neural Networks", 8th IEEE, IET International Symposium on Communication Systems, Networks and Digital Signal Processing, Jul. 18, 2012, 4 pages.
Chopra, et al., "Learning a similarity metric discriminatively, with application to face verification", In IEEE Conference on Computer Vision and Pattern Recognition (CVPR), 2005, 8 pages.
Dong, et al., "Compression Artifacts Reduction by a Deep Convolutional Network", IEEE International Conference on Computer Vision, Apr. 27, 2015, pp. 576-584.
Dong, et al., "Learning a Deep Convolutional Network for Image Super-Resolution", ECCV 2014, Part IV, LNCS 8692, Sep. 6, 2014, 16 pages.
Kim, et al., "Example-based Learning for Single-Image Super-Resolution and JPEG Artifact Removal", Technical Report No. TR-173, retrieved on Jun. 1, 2016 from http://www.kyb.mpg.de/fileadmin/user_upload/files/publications/attachments/TechReport-173, Aug. 2008, 28 pages.
Kwon, et al., "Adaptive Postprocessing Algorithm in Block-Coded Images Using Block Classification and MLP", IEEE Transactions on Fundamentals of Electronics, Communications and Computer Sciences, Engineering Sciences Society, vol. E86-A, No. 4, Apr. 1, 2003, pp. 961-967.
Liu, et al., "Nonparametric Scene Parsing: Label Transfer via Dense Scene Alignment", IEEE Conference on Computer Vision and Pattern Recognition, Jun. 2009, 8 pages.
Long, et al., "Fully convolutional networks for semantic segmentation", IEEE Conference on Computer Vision and Pattern Recognition (CVPR), 2015, pp. 3431-3440.
Matikainen, et al., "Model Recommendation for Action Recognition", IEEE Conference on Computer Vision and Pattern Recognition, 2012, pp. 2256-2263.
Mittal, et al., "No-Reference Image Quality Assessment in the Spatial Domain", IEEE Transactions on Image Processing, vol. 21, Issue 12, Dec. 2012, pp. 4695-4708.
Nielsen, "A Visual Proof That Neural Nets Can Compute Any Function", Neural Networks and Deep Learning, Chapter 4, XP055562061, Feb. 6, 2015, 32 pages.
Pan, et al., "A Survey on Transfer Learning", IEEE Transactions on Knowledge and Data Engineering, vol. 22, No. 10, Oct. 2010, pp. 1345-1359.

(56) References Cited

OTHER PUBLICATIONS

Park, et al., "Super-Resolution Image Reconstruction: A Technical Overview", IEEE Signal Processing Magazine, vol. 20, No. 3, May 1, 2003, pp. 21-36.
Shi, et al., "Is the Deconvolution Layer the Same as a Convolutional Layer?", retrieved on Mar. 11, 2019 from https://arxiv.org/ftp/arxiv/papers/1609/1609.07009.pdf, Sep. 22, 2016, 7 pages.
Torralba, et al., "80 million tiny images: a large dataset for non-parametric object and scene recognition", IEEE Transactions on Pattern Analysis and Machine Intelligence, vol. 30, Issue 11, Nov. 2008, 12 pages.
Wagstaff, et al., "Constrained K-means clustering with background knowledge", Proceedings of the Eighteenth International Conference on Machine Learning, 2001, 8 pages.
Wang et al., "Deep Networks for Image Super-Resolution with Sparse Prior", International Conference on Computer Vision (ICCV), Dec. 1, 2015, 9 pages.
Wang, et al., "Self-Tuned Deep Super Resolution", 2015 IEEE Conference on Computer Vision and Pattern Recognition Workshops, XP032795527, 2015, 8 pages.
Yang, et al., "Coupled Dictionary Training for Image Super-Resolution", IEEE Transactions on Image Processing, vol. 21, Issue 8, Aug. 2012, 27 pages.
Yang, "Image super-resolution via sparse representation", IEEE Transactions on Image Processing, vol. 19, Issue 11, Nov. 2010, 51 pages.
Yang, et al., "Single-Image Super-Resolution Reconstruction via Learned Geometric Dictionaries and Clustered Sparse Coding", IEE Transactions on Image Processing, vol. 21, No. 9, Sep. 1, 2012, 13 pages.
Yu, et al., "VLSI Friendly Fast CU/PU Mode Decision for HEVC Intra Encoding: Leveraging Convolution Neural Network", 2015 IEEE International Conference on Image Processing, Sep. 27, 2015, pp. 1285-1289.
Zeyde, et al., "On Single Image Scale-Up Using Sparse-Representations", Curves and Surfaces, Springer, 2012, 20 pages.
Zuo, et al., "Content-Adaptive Resolution Enhancement of Compressed Video with Encoder-Generated Side Information", International Conference on Consumer Electronics, Jan. 9, 2008, pp. 1-2.
Office Action for European Application No. 16706415.3, dated Dec. 3, 2019, 3 pages.
Office Action for European Application No. 16706418.7, dated Nov. 15, 2019, 8 pages.
Cramer, "Neural Networks for Image and Video Compression: A Review", European Journal of Operational Research, vol. 108, No. 2, Jul. 16, 1998, pp. 266-282.
Jiang, "Image Compression with Neural Networks—A Survey", Signal Processing: Image Communication, vol. 14, No. 9, 1999, pp. 737-760.
Kim, et al., "Neural Concurrent Subsampling and Interpolation for Images", 1999 IEEE Tencon, vol. 2, Sep. 15-17, 1999, pp. 1327-1330.

\* cited by examiner

ENCODER PRE-ANALYSER

CROSS REFERENCE TO RELATED APPLICATIONS

This application is a continuation of, and claims priority to, International Patent Application No. PCT/GB2017/051253, filed on May 5, 2017, which claims priority to United Kingdom Application No. GB 1607994.9, filed on May 6, 2016, the contents of both of which are incorporated herein by reference in their entireties.

TECHNICAL FIELD

The present disclosure relates to analysing input data, prior to encoding, using one or more hierarchical algorithms.

BACKGROUND

Motion compensation and intraprediction are important aspects of video compression which predict the data in a current frame from previously transmitted frames or from previously encoded parts of the same frame. This allows transmission of only the residual differences between the current frame and a prediction.

Figure 1:
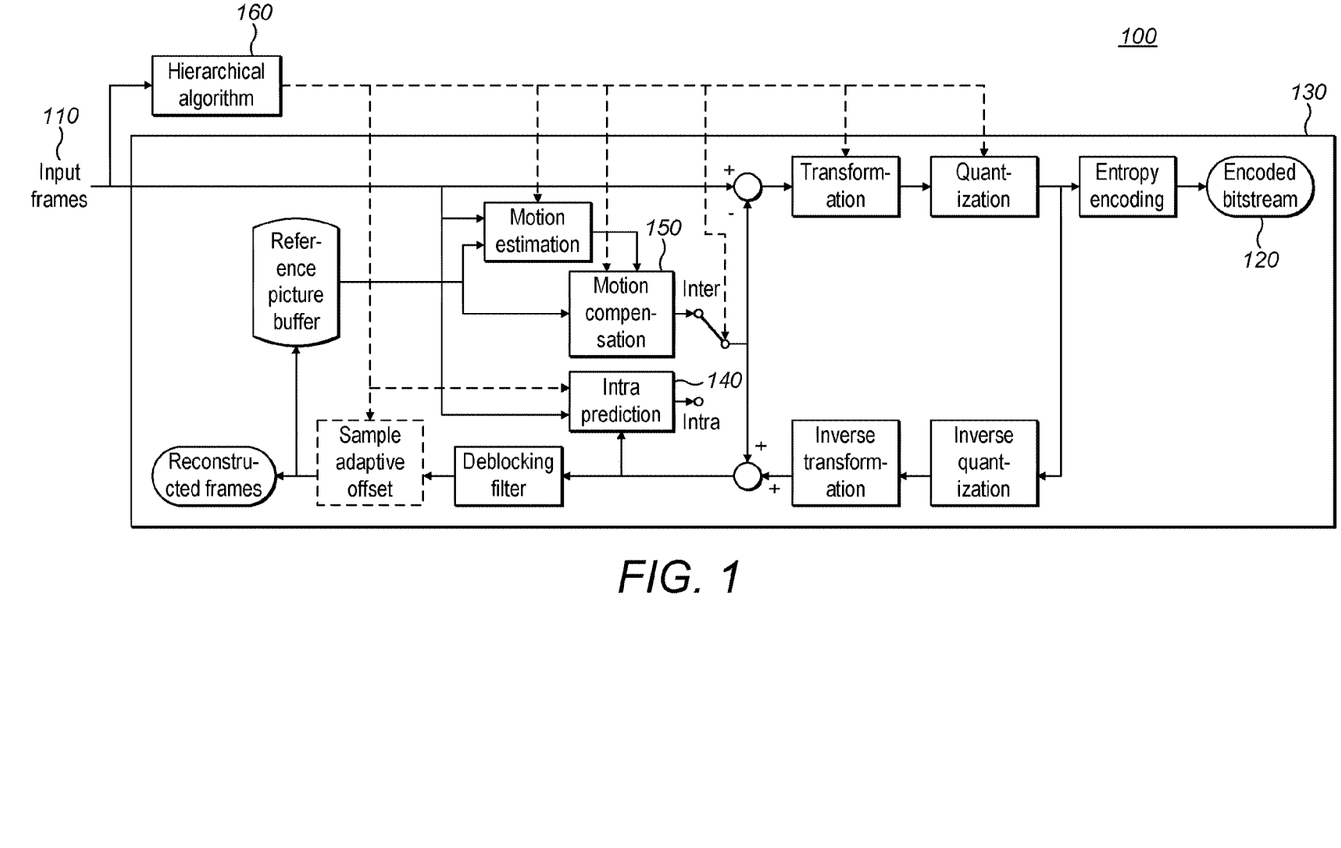
FIG. 1 illustrates a generic video encoder with a pre-analyser, in the form of a hierarchical algorithm, providing different modules of the encoder with an optimal decision for the input data.

Many video compression technologies apply such predictions including H.264, HEVC, Daala and many others. FIG. 1 illustrates an example of a generic video encoder 130 taking input data 110 and producing an encoded output 120, which may apply one or more of these technologies. An intra-prediction module 140 and motion compensation module 150 provide the encoder with predictions of samples from within the same picture or from reference pictures respectively.

However, the most optimal prediction might not yield the best compression efficiency due to additional overhead of syntax and syntax prediction. For example, when an optimal prediction is achieved by splitting the block and applying a large number of motion vectors, the syntax overhead for signalling this structure may be larger than the overhead had the block not been split and additional residual information added.

Furthermore, due to inherent properties of the human visual system, visual distortions in some areas of an image are more visible than in other areas. Therefore, an essential part in optimising a subjective quality of the resulting bit stream is the Rate Distortion Optimisation ('RDO') or mode decision process. This process selects, for a given bit rate, the optimal prediction (mode), motion vectors, and quantisation parameters, taking into account the introduced distortion and resulting bit rate. In many encoders the RDO uses objective metrics based upon mathematical distortions such as PSNR, SSE, and SAD. Consequently, any subjective distortion is not taken into account.

To improve the distribution of bits towards subjectively important areas, a pre-analysis process can be undertaken.

SUMMARY

Aspects and/or embodiments are set out in the appended claims. Some aspects and/or embodiments can improve the compression performance of input data using one or more hierarchical algorithms.

According to a first aspect, there is provided a method for producing output data using one or more input data and one or more hierarchical algorithms, comprising the steps of applying the hierarchical algorithm to the one or more input data; and producing output data to be used by an encoder; wherein one of the one or more input data is uncompressed; and wherein the output data is used to modify a decision making process associated with the encoder. This can enable subjective distortion of the input data to be taken into account and to improve the distribution of bits towards the subjectively important areas of the input data, identifying areas where more bits should be used and where the compression should be weakened, as well as indicate areas of the input where the compression may be increased up to a predetermined maximum. This can ensure a higher quality of experience compared to encoders without any modification of the mode decision process.

In some implementations, the decision making process may be any of; a mode decision, a rate distortion optimisation, or a rate distortion optimized quantization. In some implementations, the output data may be any of: an output bit stream syntax data; binary data; text data; metadata; bit allocation description; or an intermediate format, wherein the intermediate format may describe any of a Group of Pictures structure, frame level quantisation, frame level delta quantization, frame level bit budget, a block structure of a current picture, coding unit sizes, prediction sizes, transform sizes, mode decision information, transform mode, palette mode, inter-layer prediction, Adaptive Colour Transform, Adaptive Motion Vector Resolution, Intra-Block Copy, motion vector information, delta motion vector information, inter-view prediction mode, inter-view prediction motion vector, quantisation parameters, delta quantisation parameters, and/or quantisation matrices. This can enable the most effective and appropriate data type to be selected based upon the hardware requirements of a system designed to execute the method, other components in the method, such as the encoder, or based on the type of input data and/or desired output.

In some implementations, the hierarchical algorithm may estimate visual artefacts in the one or more input data caused by compression, wherein the estimation of visual artefacts may result in any of a probability density functions, visual distortion functions, psycho-visual distortion function, bit allocation functions, bit density functions, energy retention function, detail retention function, and/or bit probability functions. In some implementations, the estimation of visual artefacts may indicate one or more regions, wherein the one or more regions indicate regions where the encoder should spend more processing power so as to enhance the perceptual reconstruction. This can enable an optimal compression whilst maintaining quality by ensuring regions where more processing power should be used are compressed more efficiently having a lower effect on the overall perceived quality of the reconstructed pictures from the encoded data.

In some implementations, the hierarchical algorithm provides data that is further translated or acted upon by functionality embedded in the encoder or sub-process of the encoder.

In some implementations, an input to the one or more hierarchical algorithms may be a saliency map. In some implementations, one or more intermediate steps of the one or more hierarchical algorithms may comprise producing a saliency map. In some implementations, in some embodiments, the sole goal of the hierarchical algorithm may be to produce the saliency map. This can enable the visual saliency of the input data to be taken into account when performing any pre-analysis.

In some implementations, the one or more input data may be any of pixel accurate, sub-block accurate, block-accurate, group of blocks accurate, slice accurate, tile accurate, field accurate, or frame accurate. In some implementations, the output data is any of pixel accurate, sub-block accurate, block-accurate, group of blocks accurate, slice accurate, tile accurate, field accurate, or frame accurate. This can enable the input and output data to be determined by one or more predetermined metrics or based upon the requirements and the specification of any hardware designed to execute the method.

In some implementations, the method may further comprise the step of training the one or more hierarchical algorithms, wherein the step of training may comprise using the uncompressed input data and the reconstructed decompressed data from the encoder, and the step of training may comprise minimising a predetermined cost function. In some implementations, the cost function may relate to a visual quality metric which may be subjective or objective. In some implementations, the cost function may be content adaptive. In some embodiments the cost function comprises a perceptual loss function. In some implementations, the step of training may further comprise using one or more saliency maps. Training the hierarchical algorithm can enable produce an improved encoding by evaluating previous results from the encoding and/or pre-analysis.

In some implementations, the step of training may further comprise using one or more data corresponding to substantially optimal encoding decisions in terms of a Group of Pictures structure, frame level quantisation, frame level delta quantization, frame level bit budget, block structure, coding unit sizes, prediction sizes, transform sizes, mode decision information, transform mode, palette mode, inter-layer prediction, Adaptive Colour Transform, Adaptive Motion Vector Resolution, Intra-Block Copy, motion vector information, delta motion vector information, inter-view prediction mode, inter-view prediction motion vector, quantisation parameters, delta quantisation parameters, and/or quantisation matrices. This can enable the data to be determined by one or more predetermined metrics or based upon the requirements and the specification of any hardware designed to execute the method.

In some implementations, the step of training may be used to train the hierarchical algorithm and the encoder. In some implementations, the output of the encoder may be used as an input to optimise one or more variables associated with the hierarchical algorithm. This can enable the output of any pre-analysis and the output of the encoder to be refined so as to provide an improved encoding.

In some implementations, the one or more hierarchical algorithms are incorporated within an architecture of the encoder, wherein the architecture of the encoder may be directed towards one or more processes. In some implementations, the one or more processes may be any of, providing one or more optimal motion vectors, and/or using one or more external networks to produce one or more optimal quantization settings, and/or using one or more external networks to produce one or more optimal quantization matrices, and/or using one or more external networks to produce one or more optimal prediction sizes, and/or using one or more external networks to produce one or more optimal coding unit sizes, and/or using one or more external networks to produce one or more optimal transform sizes, and/or using one or more external networks to produce one or more optimal block sizes. This can enable the encoder and the pre-analyser to be determined by one or more predetermined metrics or based upon the requirements and the specification of any hardware designed to execute the method.

In some implementations, the encoder may be a generic encoder, wherein the step of training may include evaluating all mathematical possibilities, and selecting the most mathematically optimal possibility. In some implementations, the decisions of the encoder may be applied to non-optimal encoders. This can enable all possible encodings to be considered so as to select the most appropriate and optimal encoding.

In some implementations, the one or more hierarchical algorithms may use an interpretation of a bit allocation model generated by the encoder.

In some implementations, the one or more hierarchical algorithms may be any of: pre-trained, pre-defined, fine-tuned, self-updating, selected from a database of hierarchical algorithms, or trained using a learned approach, wherein the learned approach may comprise machine learning techniques.

In some implementations, the one or more hierarchical algorithms may be received, and/or may be stored in a memory.

In some implementations, the hierarchical algorithm may be any of one or more: convolutional neural networks, recurrent neural networks, random forests, long-short term memory, memory networks, gated recurrent network, or a dictionary learning based method or methods. In some embodiments the hierarchical algorithm may comprise a generative adversarial network. In some embodiments, the hierarchical algorithm may comprise a VGG network.

The hierarchical algorithm (which may be a generative adversarial network and/or a VGG network) may be trained using a perceptual loss function.

In some embodiments, the training of convolutional neural networks can be more computationally complex than dictionary learning for a similar accuracy, but the resulting model or algorithm can also be more flexible in representing visual data while using fewer coefficients for the reconstruction. In some embodiments, the resultant convolutional neural network model to be transmitted alongside the lower-quality visual data can be both smaller and can be more accurate in the reconstruction of the higher-quality visual data.

In some implementations, the hierarchical algorithm may comprise a plurality of layers wherein the layers may be any of sequential, recurrent, recursive, branching or merging.

Having a number of layers in some embodiments, which may or may not be sequential, recurrent, recursive, branching or merging allows different levels of processing to occur at different times and the layers can work in parallel, ensuring optimal efficiency when enhancing the resolution of the visual data.

In some implementations, encoding may comprise compression, enabling the method to be used for providing an optimal compression of the input visual data.

In some implementations, the visual data may comprise at least one of: an image, a sequence of images, a video, or a section of image or video data.

This allows the method to enhance various types of visual data, including but not limited to, still images, video, and computer generated/rendered content.

Aspects and/or embodiments include a computer program product comprising software code to implement the method and/or apparatus of other aspects and/or embodiments herein described.

It should be noted that in some aspects and/or embodiments, the terms model and/or algorithm and/or representation and/or parameters and/or functions can be used interchangeably.

It should also be noted that visual data, in some embodiments, may comprise image and/or video data.

References to visual data can be references to video data and/or image data in some aspects and/or embodiments and vice versa. References to low-quality and/or lower-quality can be references to low-resolution and/or lower-resolution in some aspects and/or embodiments and vice versa. References to high-quality and/or higher-quality and/or highest quality and/or original quality can be references to high-resolution and/or higher-resolution and/or highest-resolution and/or original resolution and/or increased fidelity in some aspects and/or embodiments and vice versa. References to sections and/or frames can be references to pictures and/or portions of pictures in some aspects and/or embodiments and vice versa. References to enhance or enhancement can be references to upscale and/or upscaling in some aspects and/or embodiments and vice versa.

BRIEF DESCRIPTION

Embodiments will now be described, by way of example only and with reference to the accompanying drawings having like-reference numerals in which.

DETAILED DESCRIPTION

Various embodiments will now be described below in detail with reference to the Figures referenced above.

In some embodiments, a pre-analyser process or method, which may be one or more hierarchical algorithms, may take one or more pieces of uncompressed input data to generate an output which may be used by an encoder to modify one or more processes in the encoder. These processes may be the RDO or mode decision process in relation to optimizing the subjective quality of an input bit stream. The output data may be encoder settings.

As shown in FIG. 1, a generic encoder 130 may have a pre-analyser 160 in the form of a hierarchical algorithm, however it will be appreciated other forms of pre-analyser may be appropriate. The pre-analyser 160, may take uncompressed input data 110 and produce an output bit stream to the encoder 130. The output bit stream may take a number of forms, for example it may be syntax data, binary data, text data, metadata, bit allocation description, or any intermediate format describing the encoding decisions or bit distribution among frames and blocks within frames taking into account the total bit rate of the bit stream. The intermediate format may describe any of a Group of Pictures structure, frame level quantisation, frame level delta quantization, frame level bit budget, a block structure of a current picture, coding unit sizes, prediction sizes, transform sizes, mode decision information, transform mode, palette mode, inter-layer prediction, Adaptive Colour Transform, Adaptive Motion Vector Resolution, Intra-Block Copy, motion vector information, delta motion vector information, inter-view prediction mode, inter-prediction motion vector, quantisation parameters, delta quantisation parameters, quantisation matrices and/or bit budget. It will be appreciated that other intermediate formats may be used.

It will also be appreciated that the generic encoder 130 may comprise a scalable or Multiview video encoder.

The pre-analyser 160 may estimate visual artefacts in the input due to compression. This estimation may result in one or more probability density functions, visual distortion functions, psycho-visual distortion functions, bit allocation functions, bit density functions, energy retention functions, detail retention functions, and/or bit probability functions. The estimation, regardless of the type of function, indicates the subjectively important regions and describe the areas where the encoder 160 should allocate more bits or spend more processing power to allow for an enhanced perceptual reconstruction.

Furthermore, in some embodiments, the hierarchical algorithm 160 may use as an input of one or more saliency maps. In some implementations, one or more of the intermediate steps of the hierarchical algorithm may result in the production of a saliency map representing the visual saliency of the input 110. In some embodiments, the sole goal of the hierarchical algorithm may be to produce a saliency map.

In some implementations, input data 110 to the hierarchical algorithm may be any of pixel accurate data, sub-block accurate data, block accurate data, group of block accurate data, slice accurate data, tile accurate data, field accurate data, or frame accurate data. It will be appreciated that other input data may be appropriate.

Figure 2:
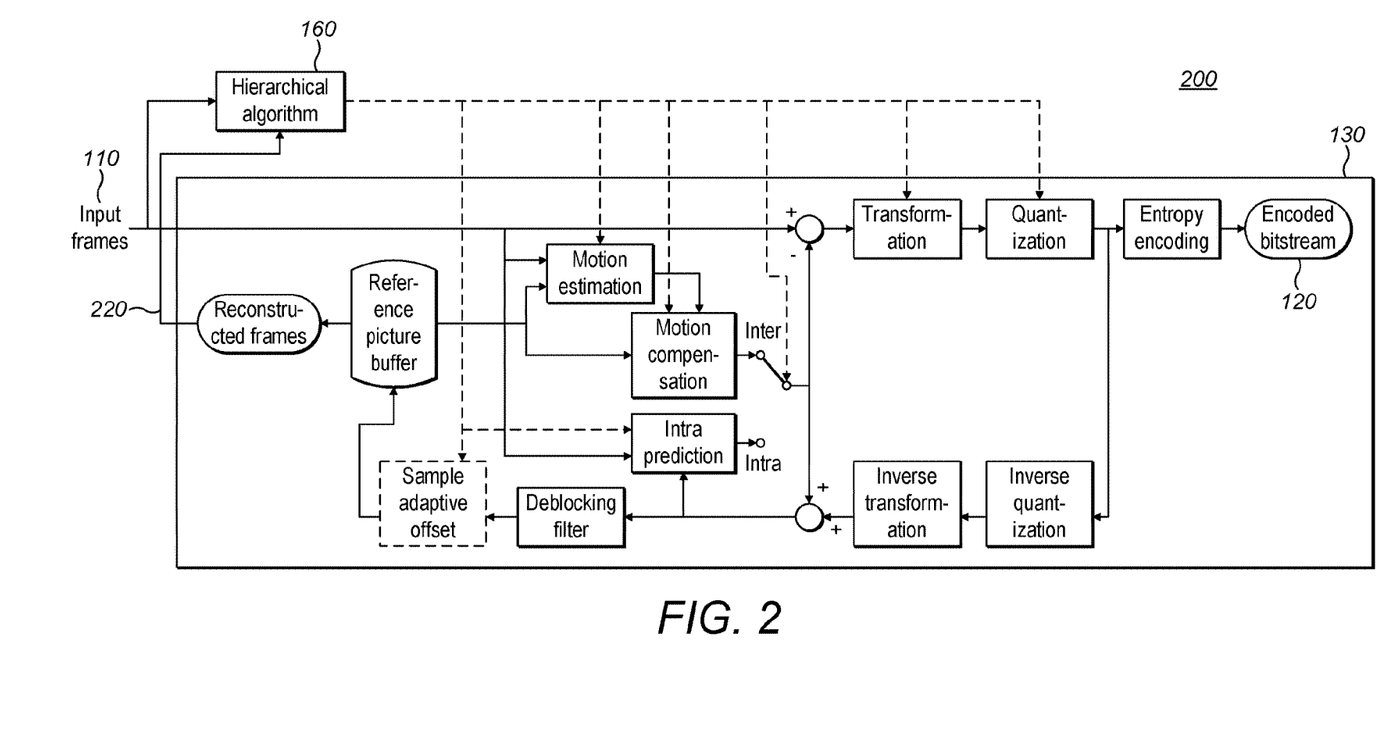
FIG. 2 illustrates an updating pre-analyser network that takes in reconstructed data.

FIG. 2 shows another embodiment 200, wherein the one or more hierarchical algorithms 160 are trained. In said embodiment, the hierarchical algorithm 160 may be trained by receiving uncompressed input data 110, and reconstructed decompressed data 220 from the encoder 130 that has been reconstructed using the output data from the hierarchical algorithm 160. The training of the one or more hierarchical algorithms 160 may be achieved by minimising a predetermined cost function between the input data 110 and the reconstructed data 220. In some embodiments, the cost function may be a (psycho) visual quality metric. The (psycho) visual quality metric may relate to objective metrics based upon mathematical distortions, or may relate to subjective metrics aimed at enhancing any subjective distortions.

The training process may involve providing one or more saliency maps to the one or more hierarchical algorithms 160. Training may comprise using one or more data corresponding to any of one or more substantially optimal encoding decisions in terms of a Group of Pictures structure, frame level quantisation, frame level delta quantization, frame level bit budget, block structure, coding unit sizes, prediction sizes, transform sizes, mode decision information, transform mode, palette mode, inter-layer prediction, Adaptive Colour Transform, Adaptive Motion Vector Resolution, Intra-Block Copy, motion vector information, delta motion vector information, inter-view prediction mode, inter-view prediction motion vector, quantisation parameters, delta quantisation parameters and/or quantisation matrices. It will be appreciated that other substantially optimal encoding decisions may be used. For example, the hierarchical algorithm 160 can be trained on sets of input frames 110 with known substantially optimal encoder decisions to reproduce the optimal encoder decisions from the input frames 110. The training may be performed by minimising a cost function between encoder decision data output by the hierarchical algorithm 160 and the known substantially optimal encoder decision data.

In some embodiments, the training process may be used to train the hierarchical algorithm 160 and the encoder 130. In another embodiment, the output bit stream 120 of the encoder may be provided as an input to the one or more hierarchical algorithms 160 so that it may be used to optimise one or more variables associated with the one or more hierarchical algorithms 160.

Figure 3:
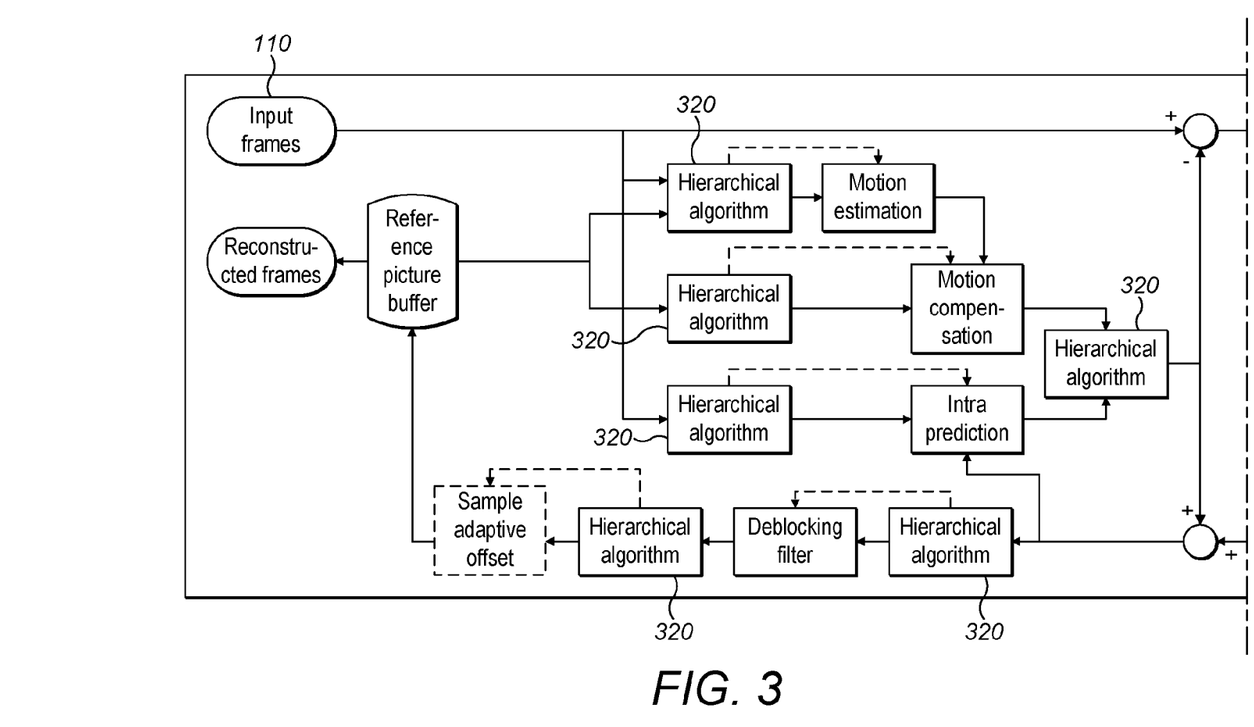
FIG. 3 illustrates a pre-analyser, in the form of a hierarchical algorithm, as part of an encoder.

FIG. 3 shows yet a further embodiment, wherein the one or more hierarchical algorithms 320 are incorporated within an architecture of the encoder 310. The architecture of the encoder may be directed towards one or more processes which may include but is not limited to, providing one or more optimal motion vectors, and/or using one or more external networks to producing one or more optimal quantization settings, and/or using one or more external networks to produce one or more optimal quantization matrices, and/or using one or more external networks to produce one or more optimal prediction sizes, and/or using one or more external networks to produce one or more optimal coding unit sizes, and/or using one or more external networks to produce one or more optimal transform sizes, and/or using one or more external networks to produce one or more optimal block sizes. It will be appreciated that other processes may be used where appropriate.

The encoder 130, 310 may be a generic encoder, wherein training the encoder involves evaluating all mathematical possibilities and selecting the most mathematically optimal possibility. In other embodiments, the decisions of the encoder may be applied to non-optimal encoders, and the one or more hierarchical algorithms 160, 320 may use an interpretation of a bit allocation model generated by the encoder. It will be appreciated that other interpretations may be used where appropriate.

In some embodiments, the hierarchical algorithm may comprise a generative adversarial network. Generative adversarial networks (GANs) are known per se to those skilled in the art and so will not be described in detail here. The hierarchical algorithm may be trained using a perceptual loss function. Perceptual loss functions are also known per se and so will not be described in detail here. Reference is directed to:

Christian Ledig et al, "Photo-Realistic Single Image Super-Resolution Using a Generative Adversarial Network", arXiv:1609.04802; and Casper Kaae Sønderby et al, "Amortised MAP Inference for Image Super-resolution", arXiv: 1610.04490.

It will be appreciated that in any of the above mentioned embodiments, a hierarchical algorithm, may be any of, pre-defined, self-updating, selected out of a number of pre-defined hierarchical algorithms through the transmission of an index, selected out of a number of pre-defined hierarchical algorithms through an automatic classification of the input data, a self-updating pre-defined hierarchical algorithm, and/or reset to a pre-defined state or states (where multiple hierarchical algorithms are used). In some embodiments where the state or states are reset, it will be appreciated that not all states may be reset, and only a subset of the states are reset. Furthermore, in some embodiments, it will be appreciated that the hierarchical algorithm or algorithms themselves may be received and/or partially updated. It will also be appreciated that a hierarchical algorithm may be any of a convolutional neural network, recurrent neural networks, random forests, long-short term memory, memory networks, gated recurrent networks or a dictionary learning based method or methods. Furthermore, in embodiments where multiple hierarchical algorithms are used, it will be appreciated that the same hierarchical algorithm or same type of hierarchical algorithm does not need to be used throughout the method described in the embodiment. It will also be appreciated that the hierarchical algorithm may operate in a linear or non-linear space.

Furthermore, in any of the above mentioned embodiments, the hierarchical algorithms may operate in parallel with other hierarchical algorithms operating on the same input and generating an output for the same prediction. It will also be appreciated that the hierarchical algorithms may incorporate Sample Adaptive Offset and/or de-blocking filters and/or any other post filters as applicable. It will also be appreciated that the hierarchical algorithms, where appropriate may share layers of other hierarchical algorithms.

The above described methods can be implemented at a node within a network, such as a content server containing video data, as part of the video encoding process prior to transmission of the video data across the network or as part of the transcoding process prior to transmission of the video data across the network or storage.

Any system feature as described herein may also be provided as a method feature, and vice versa. As used herein, means plus function features may be expressed in terms of their corresponding structure.

Any feature in one embodiment may be applied to other embodiments, in any appropriate combination. In particular, method embodiments may be applied to system embodiments, and vice versa. Furthermore, any, some and/or all features in one embodiment can be applied to any, some and/or all features in any other embodiment, in any appropriate combination.

It should also be appreciated that specific combinations of the various features described and defined in any embodiments can be implemented and/or supplied and/or used independently.

Some of the example embodiments are described as processes or methods depicted as diagrams. Although the diagrams describe the operations as sequential processes, operations may be performed in parallel, or concurrently or simultaneously. In addition, the order or operations may be re-arranged. The processes may be terminated when their operations are completed, but may also have additional steps not included in the figures. The processes may correspond to methods, functions, procedures, subroutines, subprograms, etc.

Methods discussed above, some of which are illustrated by the diagrams, may be implemented by hardware, software, firmware, middleware, microcode, hardware description languages, or any combination thereof. When implemented in software, firmware, middleware or microcode, the program code or code segments to perform the relevant tasks may be stored in a machine or computer readable medium such as a storage medium. A processing apparatus may perform the relevant tasks.

Figure 4:
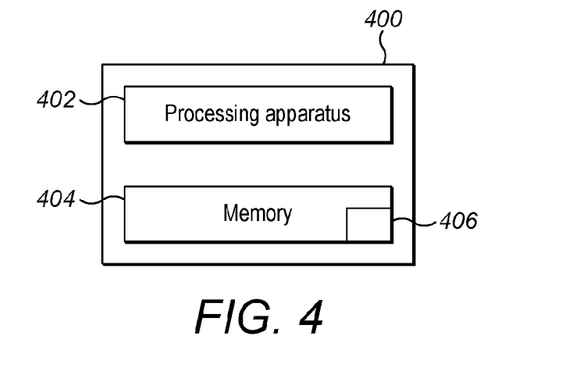
FIG. 4 shows an apparatus comprising a processing apparatus and memory according to an exemplary embodiment.

FIG. 4 shows an apparatus 400 comprising a processing apparatus 402 and memory 404 according to an exemplary embodiment. Computer-readable code 406 may be stored on the memory 404 and may, when executed by the processing apparatus 402, cause the apparatus 400 to perform methods as described here, for example a method with reference to FIGS. 1 to 3.

The processing apparatus 402 may be of any suitable composition and may include one or more processors of any suitable type or suitable combination of types. Indeed, the term "processing apparatus" should be understood to encompass computers having differing architectures such as single/multi-processor architectures and sequencers/parallel architectures. For example, the processing apparatus may be a programmable processor that interprets computer program instructions and processes data. The processing apparatus may include plural programmable processors. The processing apparatus may be, for example, programmable hardware with embedded firmware. The processing apparatus may include Graphics Processing Units (GPUs), or one or more specialised circuits such as field programmable gate arrays FPGA, Application Specific Integrated Circuits (ASICs), signal processing devices etc. In some instances, processing apparatus may be referred to as computing apparatus or processing means.

The processing apparatus 402 is coupled to the memory 404 and is operable to read/write data to/from the memory 404. The memory 404 may comprise a single memory unit or a plurality of memory units, upon which the computer readable instructions (or code) is stored. For example, the memory may comprise both volatile memory and non-volatile memory. In such examples, the computer readable instructions/program code may be stored in the non-volatile memory and may be executed by the processing apparatus using the volatile memory for temporary storage of data or data and instructions. Examples of volatile memory include RAM, DRAM, and SDRAM etc. Examples of non-volatile memory include ROM, PROM, EEPROM, flash memory, optical storage, magnetic storage, etc.

An algorithm, as the term is used here, and as it is used generally, is conceived to be a self-consistent sequence of steps leading to a desired result. The steps are those that may involve physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Methods described in the illustrative embodiments may be implemented as program modules or functional processes including routines, programs, objects, components, data structures, etc., that perform specific tasks or implement specific functionality, and may be implemented using existing hardware. Such existing hardware may include one or more processors (e.g. one or more central processing units), digital signal processors (DSPs), application-specific-integrated-circuits, field programmable gate arrays (FPGAs), computers, or the like.

Unless specifically stated otherwise, or as is apparent from the discussion, terms such as processing or computing or calculating or determining or the like, refer to the actions and processes of a computer system, or similar electronic computing device. Note also that software implemented aspects of the example embodiments may be encoded on some form of non-transitory program storage medium or implemented over some type of transmission medium. The program storage medium may be magnetic (e.g. a floppy disk or a hard drive) or optical (e.g. a compact disk read only memory, or CD ROM), and may be read only or random access. Similarly the transmission medium may be twisted wire pair, coaxial cable, optical fibre, or other suitable transmission medium known in the art. The example embodiments are not limited by these aspects in any given implementation.

Further implementations are summarized in the following examples:

EXAMPLE 1

A method for producing output data using one or more input data and one or more hierarchical algorithms, comprising the steps of: applying the hierarchical algorithm to the one or more input data; and producing output data to be used by an encoder; wherein one of the one or more input data is uncompressed; and wherein the output data is used to modify a decision making process associated with the encoder.

EXAMPLE 2

The method of example 1, wherein the decision making process may be any of; a mode decision, or a rate distortion optimisation, or a rate distortion optimized quantization.

EXAMPLE 3

The method of any previous example, wherein the output data is any of: an output bit stream syntax data; binary data; text data; metadata; bit allocation description; or an intermediate format.

EXAMPLE 4

The method of example 3, wherein the intermediate format describes the outcome of any of the decisions of the encoder and/or sub-processes executed in the encoder.

EXAMPLE 5

The method of example 4, wherein the intermediate format describes any of a Group of Pictures structure, frame level quantisation, frame level delta quantization, frame level bit budget, block structure of a current picture, coding unit sizes, prediction sizes, transform sizes, mode decision information, transform mode, palette mode, inter-layer prediction, Adaptive Colour Transform, Adaptive Motion Vector Resolution, Intra-Block Copy, motion vector information, delta motion vector information, inter-view prediction mode, inter-view prediction motion vector, quantisation parameters, delta quantisation parameters, and/or quantisation matrices.

EXAMPLE 6

The method of any previous example, wherein the hierarchical algorithm estimates visual artefacts in the one or more input data caused by compression.

EXAMPLE 7

The method of example 6, wherein the estimation of visual artefacts results in any of a probability density functions, visual distortion functions, psycho-visual distortion function, bit allocation functions, bit density functions, energy retention function, detail retention function, and/or bit probability functions.

EXAMPLE 8

The method of any of examples 6 or 7, wherein the estimation of visual artefacts indicates one or more regions.

EXAMPLE 9

The method of example 8, wherein the one or more regions indicate regions where the encoder should spend more processing power so as to enhance the perceptual reconstruction.

EXAMPLE 10

The method of any previous example, wherein the hierarchical algorithm indicates any of the Group of Pictures structure, and/or delta quantisation, and/or quantisation of each frame.

EXAMPLE 11

The method of any previous example, wherein an input to the one or more hierarchical algorithms is a saliency map.

EXAMPLE 12

The method of any previous example, wherein an intermediate step of the one or more hierarchical algorithms comprises producing a saliency map.

EXAMPLE 13

The method of any previous example, wherein the output of the hierarchical algorithm is a saliency map, and wherein the encoder interprets the saliency map.

EXAMPLE 14

The method of any previous example, wherein the one or more input data is any of pixel accurate, sub-block accurate, block-accurate, group of blocks accurate, slice accurate, tile accurate, field accurate, or frame accurate.

EXAMPLE 15

The method of any previous example, wherein the output data is any of pixel accurate, sub-block accurate, block-accurate, group of blocks accurate, slice accurate, tile accurate, field accurate, or frame accurate.

EXAMPLE 16

The method of any previous example, further comprising the step of training the one or more hierarchical algorithms.

EXAMPLE 17

The method of example 16, wherein the step of training comprises using the uncompressed input data and a reconstructed decompressed data from the encoder.

EXAMPLE 18

The method of any of examples 16 or 17 wherein the step of training comprises minimising a predetermined cost function.

EXAMPLE 19

The method of example 18, wherein the cost function relates to a visual quality metric.

EXAMPLE 20

The method of example 19, wherein the visual quality metric is subjective or objective, and wherein the cost function relates to a psycho-visual quality metric.

EXAMPLE 21

The method of example 18, wherein the cost function relates to a psycho-visual quality metric.

EXAMPLE 22

The method of example 21, wherein the psycho-visual quality metric is subjective or objective.

EXAMPLE 23

The method of any of examples 16 to 22, wherein the step of training further comprises using one or more saliency maps.

EXAMPLE 24

The method of any of examples 16 to 23, wherein the step of training further comprises using one or more data corresponding to substantially optimal encoding decisions.

EXAMPLE 25

The method of example 24, wherein the substantially optimal encoding decisions are any of a Group of Pictures structure, frame level quantisation, frame level delta quantization, frame level bit budget, block structure, coding unit sizes, prediction sizes, transform sizes, mode decision information, transform mode, palette mode, inter-layer prediction, Adaptive Colour Transform, Adaptive Motion Vector Resolution, Intra-Block Copy, motion vector information, delta motion vector information, inter-view prediction mode, inter-view prediction motion vector, quantisation parameters, delta quantisation parameters, and/or quantisation matrices.

EXAMPLE 26

The method of any of examples 16 to 25, wherein the step of training is used to train the hierarchical algorithm and the encoder.

EXAMPLE 27

The method of examples 26, wherein the encoder is a generic encoder.

EXAMPLE 28

The method of example 27, wherein the step of training includes evaluating all mathematical possibilities, and selecting the most mathematically optimal possibility.

EXAMPLE 29

The method of any of example 27 or 28, wherein the decisions of the encoder are applied to non-optimal encoders.

EXAMPLE 30

The method of any previous example, wherein the output of the encoder is used as an input to optimise one or more variables associated with the hierarchical algorithm.

EXAMPLE 31

The method of any previous example, wherein the one or more hierarchical algorithms are incorporated within an architecture of the encoder.

EXAMPLE 32

The method of example 31, wherein the architecture of the encoder is directed towards one or more processes.

EXAMPLE 33

The method of example 32, wherein the one or more processes are any of, providing one or more optimal motion vectors, and/or using one or more external networks to produce one or more optimal quantization settings, and/or using one or more external networks to produce one or more optimal quantization matrices, and/or using one or more external networks to produce one or more optimal prediction sizes, and/or using one or more external networks to produce one or more optimal coding unit sizes, and/or using one or more external networks to produce one or more optimal transform sizes, and/or using one or more external networks to produce one or more optimal block sizes, and/or using one or more external networks to produce one or more optimal transform modes, and/or using one or more external networks to produce one or more optimal palette modes, and/or using one or more external networks to produce one or more Adaptive Colour Transforms, and/or using one or more external networks to produce one or more optimal transform modes, and/or using one or more external networks to produce one or more optimal intra-block copy motion vectors, and/or using one or more external networks to produce one or more optimal inter-layer prediction flags, and/or using one or more external networks to produce one or more optimal inter-view prediction flags, and/or using one or more external networks to produce one or more optimal inter-view prediction motion vectors.

EXAMPLE 34

The method of any of examples 16 through 33, wherein the one or more hierarchical algorithms use an interpretation of a bit allocation model generated by the encoder.

EXAMPLE 35

The method of any previous example, wherein the encoder indicates different processes which may aid in the reconstruction of the output data.

EXAMPLE 36

The method of any previous example, wherein the one or more hierarchical algorithms is any of: pre-trained, pre-defined, fine-tuned, self-updating, selected from a database of hierarchical algorithms, or trained using a learned approach.

EXAMPLE 37

The method of example 36, wherein the learned approach comprises machine learning techniques.

EXAMPLE 38

The method of any previous example, wherein the one or more hierarchical algorithms are received.

EXAMPLE 39

The method of examples 36 or 37, wherein the one or more hierarchical algorithms are stored in a memory.

EXAMPLE 40

The method of any previous example, wherein the hierarchical algorithm is any of one or more: convolutional neural networks, recurrent neural networks, random forests, long-short term memory, memory networks, gated recurrent network, or a dictionary learning based method or methods.

EXAMPLE 41

The method of any previous example, wherein the hierarchical algorithm comprises a plurality of layers.

EXAMPLE 42

The method of example 41, wherein the layers are any of sequential, recurrent, recursive, branching or merging.

EXAMPLE 43

The method of any previous example, wherein encoding comprises compression.

EXAMPLE 44

The method of any previous example, wherein the input data comprises at least one of: an image, a sequence of images, a video, or a section of image or video data.

EXAMPLE 45

The method of any previous example, wherein the hierarchical algorithm is trained using a perceptual loss function.

EXAMPLE 46

The method of any previous example, wherein the hierarchical algorithm comprises a generative adversarial network.

EXAMPLE 47

The method of any previous example, wherein the hierarchical algorithm comprises a VGG network.

EXAMPLE 48

The method substantially as hereinbefore described in relation to FIGS. 1 to 3.

EXAMPLE 49 for carrying out the method of any previous example.

EXAMPLE 50

A computer program product comprising software code for carrying out the method of any one of examples 1 to 47.

EXAMPLE 51

Apparatus comprising: at least one processor; at least one memory including computer program code which, when executed by the at least one processor, causes the apparatus to perform the method of any one of examples 1 to 47.

EXAMPLE 52

A computer readable medium having computer readable code stored thereon, the computer readable code, when executed by at least one processor, causing the performance of the method of any one of examples 1 to 47.

What is claimed is:

1. A method for producing output data using one or more input data and one or more hierarchical algorithms, comprising:
applying the hierarchical algorithm to the one or more input data to estimate visual artefacts in the one or more input data caused by compression, the estimation of visual artefacts indicating one or more regions for the encoder to allocate an increase in processing power to modify perceptual reconstruction of the one or more regions;
producing by the hierarchical algorithm output data that includes a saliency map to be used by an encoder; and
causing the encoder to produce encoded output from the one or more input data based on the saliency map;
wherein one of the one or more input data is uncompressed; and
wherein the output data is used to modify a decision making process associated with the encoder.

2. The method of claim 1, wherein the decision making process may be any of: a mode decision, or a rate distortion optimisation, or a rate distortion optimised quantisation.

3. The method of claim 1, wherein the output data is any of: an output bit stream syntax data; binary data; text data; metadata; bit allocation description; or an intermediate format.

4. The method of claim 3, wherein the intermediate format describes the outcome of any of the decisions of the encoder and/or sub-processes executed in the encoder.

5. The method of claim 4, wherein the intermediate format describes any of a Group of Pictures structure, frame level quantisation, frame level delta quantisation, frame level bit budget, block structure of a current picture, coding unit sizes, prediction sizes, transform sizes, mode decision information, transform mode, palette mode, inter-layer prediction, Adaptive Colour Transform, Adaptive Motion Vector Resolution, Intra-Block Copy, motion vector information, delta motion vector information, inter-view prediction mode, inter-view prediction motion vector, quantisation parameters, delta quantisation parameters, and/or quantisation matrices.

6. The method of claim 1, wherein the estimation of visual artefacts results in any of a probability density function, visual distortion function, psycho-visual distortion function, bit allocation function, bit density function, energy retention function, detail retention function, and/or bit probability function.

7. The method of claim 1, wherein the hierarchical algorithm indicates any of the Group of Pictures structure, and/or delta quantisation, and/or quantisation of each frame.

8. The method of claim 1, wherein an input to the one or more hierarchical algorithms is a saliency map.

9. The method of claim 1, wherein an intermediate step of the one or more hierarchical algorithms comprises producing a saliency map.

10. The method of claim 1, wherein the one or more input data is any of pixel accurate, sub-block accurate, block-accurate, group of blocks accurate, slice accurate, tile accurate, field accurate, or frame accurate.

11. The method of claim 1, wherein the output data is any of pixel accurate, sub-block accurate, block-accurate, group of blocks accurate, slice accurate, tile accurate, field accurate, or frame accurate.

12. The method of claim 1, further comprising the step of training the one or more hierarchical algorithms.

13. The method of claim 12, wherein the step of training comprises using the uncompressed input data and a reconstructed decompressed data from the encoder.

14. The method of claim 12, wherein the step of training comprises minimising a predetermined cost function.

15. An apparatus comprising:
at least one processor; and
at least one memory including computer program code which, when executed by the at least one processor, causes the apparatus to:
apply a hierarchical algorithm to one or more input data to estimate visual artefacts in the one or more input data caused by compression, the estimation of visual artefacts indicating one or more regions for the encoder to allocate an increase in processing power to modify perceptual reconstruction of the one or more regions;
produce, by the hierarchical algorithm, output data that includes a saliency map to be used by an encoder; and
cause the encoder to produce encoded output from the one or more input data based on the saliency map;
wherein one of the one or more input data is uncompressed; and
wherein the output data is used to modify a decision making process associated with the encoder.

16. The apparatus of claim 15, wherein the estimation of visual artefacts results in any of a probability density function, visual distortion function, psycho-visual distortion function, bit allocation function, bit density function, energy retention function, detail retention function, and/or bit probability function.

17. The apparatus of claim 15, wherein an output of the hierarchical algorithm is a saliency map, and wherein the encoder interprets the saliency map.

* * * * *